United States Patent
Casey

(10) Patent No.: US 8,258,737 B2
(45) Date of Patent: Sep. 4, 2012

(54) ELECTRIC MACHINE WITH NON-COAXIAL ROTORS

(76) Inventor: John R. Casey, Appleton, WI (US)

( * ) Notice: Subject to any disclaimer, the term of this patent is extended or adjusted under 35 U.S.C. 154(b) by 536 days.

(21) Appl. No.: 12/491,177

(22) Filed: Jun. 24, 2009

(65) Prior Publication Data

US 2010/0327791 A1    Dec. 30, 2010

(51) Int. Cl.
H02P 1/00 (2006.01)
H02P 27/00 (2006.01)
H02K 47/00 (2006.01)
H02K 16/00 (2006.01)
H02K 21/10 (2006.01)
H02K 17/10 (2006.01)

(52) U.S. Cl. ........ 318/452; 318/809; 310/112; 310/114; 310/126; 310/211

(58) Field of Classification Search ............ 318/452, 318/809; 310/112, 114, 126, 211
See application file for complete search history.

(56) References Cited

U.S. PATENT DOCUMENTS

| | | | |
|---|---|---|---|
| 424,818 A | 4/1890 | Perret | |
| 1,348,539 A | 8/1920 | Breitenbach | |
| 1,858,506 A | 5/1932 | Jacobs | |
| 2,462,182 A | 2/1949 | Guerdan et al. | |
| 3,308,318 A | 3/1967 | Dunaiski et al. | |
| 5,172,784 A | 12/1992 | Varela, Jr. | |
| 5,534,738 A | 7/1996 | Miller | |
| 5,646,465 A * | 7/1997 | Paweletz | 310/90.5 |
| 5,780,950 A | 7/1998 | Yang | |
| 5,793,136 A | 8/1998 | Redzic | |
| 5,801,497 A | 9/1998 | Shamoto et al. | |
| 5,814,913 A | 9/1998 | Ojima et al. | |
| 6,049,152 A | 4/2000 | Nakano | |
| 6,278,211 B1 * | 8/2001 | Sweo | 310/114 |
| 6,297,575 B1 | 10/2001 | Yang | |
| 6,373,160 B1 | 4/2002 | Schrodl | |

(Continued)

FOREIGN PATENT DOCUMENTS

JP    2006074909 A    3/2006

(Continued)

OTHER PUBLICATIONS

Sinha et al., "The differential induction machine: Theory and performance," Sadhana, vol. 33, Part 5, Oct. 2008, pp. 663-670.

Primary Examiner — Walter Benson
Assistant Examiner — Gabriel Agared
(74) Attorney, Agent, or Firm — Ziolkowski Patent Solutions Group, SC

(57) ABSTRACT

A rotary electric machine having plural rotary elements in a non-coaxial arrangement is disclosed. The rotary electric machine includes a housing assembly, at least one stator frame mounted in the housing assembly, at least one stator winding wound on the at least one stator frame, and at least two rotors mounted in the housing assembly having axes of rotation that are non-coaxial, wherein each of the at least two rotors is mechanically decoupled from the other rotors such that each of the at least two rotors rotates independent from one another. The rotary electric machine also includes a control unit, with the control unit including at least one electronic control electrically connected to the at least one stator winding. The control unit is configured to control an exchange of power to or from each of the at least one stator windings.

28 Claims, 13 Drawing Sheets

U.S. PATENT DOCUMENTS

| | | |
|---|---|---|
| 6,376,955 B1 | 4/2002 | Arimitsu |
| 6,429,562 B2 | 8/2002 | Nakano et al. |
| 6,639,337 B1 | 10/2003 | Nakano |
| 6,710,492 B2 | 3/2004 | Minagawa |
| 6,922,004 B2 | 7/2005 | Hashimoto et al. |
| 6,943,473 B2 | 9/2005 | Furuse et al. |
| 6,998,757 B2 * | 2/2006 | Seguchi et al. ............... 310/266 |
| 7,256,524 B2 | 8/2007 | Minagawa |
| 7,259,493 B2 * | 8/2007 | Oshidari et al. ....... 310/216.114 |
| 7,276,005 B2 | 10/2007 | Morikawa |
| 7,821,169 B2 * | 10/2010 | Okazaki et al. .......... 310/156.36 |
| 7,973,441 B2 * | 7/2011 | Atallah ........................ 310/103 |
| 2004/0198136 A1 * | 10/2004 | Vogel ............................. 446/33 |
| 2008/0315698 A1 * | 12/2008 | El-Refaie et al. ............. 310/124 |
| 2009/0001831 A1 * | 1/2009 | Cho et al. ...................... 310/112 |

FOREIGN PATENT DOCUMENTS

| | | |
|---|---|---|
| JP | 2009011069 A | 1/2009 |
| KR | 200346531 Y1 | 4/2004 |

* cited by examiner

ELECTRIC MACHINE WITH NON-COAXIAL ROTORS

BACKGROUND OF THE INVENTION

Embodiments of the invention relate generally to rotary electric machines and, more particularly, to a rotary electric machine with plural rotary elements in a non-coaxial arrangement.

Electric machines that function as motors and generators have been known in the art for many years. Electric motors range in size and output and operation. Electric motors use electric current or voltage as an input and then output rotation to a shaft member. Conversely, electric generators/alternators receive the rotation of a shaft as input and then output an electric current or voltage. The application of electric machines is widely varied and can be applied in industrial applications for differential drive of adjacent machine sections or can be applied in a vehicle electric drive platform as part of an electric or hybrid vehicle, for example.

Certain electric machines have been developed that utilize multiple rotors and/or multiple stators, and various designs that relate to construction and control of electric machines having multiple coaxial rotors that are not mechanically coupled have been previously set forth. Such machines can generally be divided into two design categories: (1) a radial layer design in which the rotors are concentrically sandwiched; (2) a side-by-side design in which the rotors are axially adjacent. Most of the early multi-rotor electric machines were DC machines of the radial layer design, and the earliest had counter-rotating rotors with armature windings mounted on one rotor and field windings mounted on the other rotor, such as set forth in U.S. Pat. Nos. 424,818, 1,348, 539, 2,462,182 and 3,308,318. An early example of a machine with coaxial side-by-side rotors is given in U.S. Pat. No. 1,858,506.

With respect to the use of electric machines in a vehicular application, the trends in automotive technology point in the direction of plug-in extended-range electric vehicles with series hybrid power trains. As a result, there is considerable current interest in multi-rotor electric machines with differential torque/speed and electric regeneration capabilities. In U.S. Pat. No. 5,172,784, a hybrid electric propulsion system is disclosed that includes a motor having synchronized rotors aligned by a central pilot bearing. U.S. Pat. No. 5,793,136 discloses a differential motor/generator of the radial layer design in which two rotors interact mutually with shared stator windings. Additional, several patents disclose motor/generators having sandwiched or coaxial side-by-side rotors, such as U.S. Pat. No. 6,049,152 which describes rotors having different numbers of magnetic poles, and an electronic control supplying composite stator current which allows the rotors to operate at different synchronous speeds.

The use of multiple coaxial rotors is set forth in U.S. Pat. No. 6,297,575, which describes an electric machine having a three layer structure "sharing a common axis" with "two independently interactive coaxial electromechanical effect actuators," and in U.S. Pat. No. 6,373,160, which sets forth an electric machine that includes an electronic motor control and "separate rotors . . . having a same axis of rotation," and in U.S. Pat. No. 6,922,004, which discloses an axial flux motor assembly with coaxial side-by-side rotors having planetary output gearing. In the October 2008 issue of Sadhana, a journal of the Indian Academy of Sciences, a paper presents the construction and equivalent electric circuit of a differential induction machine with coaxial side-by-side rotors.

The paradigm in all of the aforementioned inventions is that the rotors are coaxial. While the use of coaxial rotors is necessary in a radial layer design, such an arrangement is not needed in a side-by-side design. While functional, the prior design of electric machines to have rotors in a coaxial, side-by-side arrangement presents limitations on the design of the electric machine. For example, arranging the rotors in a coaxial arrangement may be undesirable when incorporating the machine into an electric or hybrid vehicle where the amount of space may be limited.

Therefore, it would be desirable to design a rotary electric machine with plural rotary elements not subject to unnecessary coaxial restriction, in order to provide a space saving arrangement. It would further be desirable for the rotary electric machine to provide for rotation of the plural rotary elements at differential speeds, such that the rotary electric machine can be implemented in a vehicle electric drive platform or other system in which differential speeds are desired.

BRIEF SUMMARY OF THE INVENTION

Embodiments of the invention are directed to a rotary electric machine with non-coaxial rotors which may rotate at differential speeds. The machine includes a housing assembly, at least one stator frame (which may share structure with the housing assembly), at least one stator winding, and at least two rotors with axes of rotation that are non-coaxial. The stator(s) and rotors are held by the common housing assembly. The rotors may be of the same or different types of construction, and may rotate at the same or different speeds and directions. The rotors are mechanically decoupled from one another, but there may be electromagnetic coupling between them. Electric power to or from the one or more stator windings is exchanged through one or more electronic controls, which may include, but are not limited to, rectifiers, converters, inverters or drives.

It is envisioned that embodiments of the invention can be applied in a vehicle electric drive platform, and may provide advantages for performance, cost, and design considerations such as ground clearance, drive shaft angularity and body design. The electric machine with non-coaxial rotors may function as a combined motor/generator, an electromagnetic coupling between an engine and drive train of a vehicle, a differential drive between left and right wheels, or a differential drive between front and rear of a four-wheel drive vehicle. Embodiments of the invention may also find industrial application for differential drive of adjacent machine sections with non-coaxial drive axes.

In accordance with one aspect of the invention, a rotary electric machine includes a housing assembly, at least one stator frame mounted in the housing assembly, at least one stator winding wound on the at least one stator frame, and at least two rotors mounted in the housing assembly and having axes of rotation that are non-coaxial, wherein each of the at least two rotors is mechanically decoupled from the other rotors such that each of the at least two rotors rotates independent from one another. The rotary electric machine also includes a control unit, with the control unit including at least one electronic control electrically connected to the at least one stator winding. The control unit is configured to control an exchange of power to or from each of the at least one stator windings.

In accordance with another aspect of the invention, a rotary electric machine includes a housing assembly, at least one stator frame mounted in the housing assembly, and at least one stator winding wound on the at least one stator frame. The rotary electric machine also includes a plurality of rotors mounted in the housing assembly, with the plurality of rotors including a rotor whose axis of rotation is non-coaxial from an axis of rotation of at least one other rotor in the plurality of rotors. The plurality of rotors includes at least a first rotor and a second rotor mechanically decoupled from the first rotor, wherein each of the first rotor and the second rotor has electromagnetic interaction with the at least one stator winding when the at least one stator winding is supplied with power. The rotary electric machine further includes a control unit comprising at least one power circuit to control an exchange of power to or from each of the at least one stator windings to cause rotation of at least one of the first rotor and the second rotor, with the control unit configured to receive an input signal for each of the first and second rotors, the input signal including data on at least one of rotor speed, rotor position, or rotor torque for each of the first and second rotors and determine a stator current to transmit to each of the at least one stator windings, such that a speed and a direction of rotation of each of the first rotor and the second rotor is independently controllable.

In accordance with yet another aspect of the invention, a rotary electric machine configured to supply tractive power in a vehicle includes a unitary housing assembly, at least one stator frame mounted in the unitary housing assembly, at least one stator winding wound on the at least one stator frame and a control unit configured to control an exchange of power to or from each of the at least one stator windings. The rotary electric machine also includes a plurality of rotors housed in the unitary housing assembly, with the plurality of rotors including a rotor whose axis of rotation is non-coaxial from an axis of rotation of at least one other rotor in the plurality of rotors, and wherein the plurality of rotors includes a first rotor mechanically coupled to supply tractive power to a first wheel or set of wheels on the vehicle and a second rotor mechanically decoupled from the first rotor. The second rotor is either mechanically coupled to supply tractive power to a second wheel or set of wheels on the vehicle or is mechanically coupled to receive a rotary input that drives the second rotor as a generator. The control unit included in the rotary electric machine is configured to selectively control power exchanged to or from the plurality of rotors.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE INVENTION

The following descriptions describe various embodiments of electric machines having non-coaxial rotors. It is recognized that additional embodiments of such electric machines are also envisioned and that the scope of the invention is not to be limited by the embodiments described here below. For example, additional embodiments of the invention may include any number of rotors, at least two of which are non-coaxial, in any angular orientation with either intersecting or non-intersecting axes. In the following embodiments, design details of rotors, stators, bearings, gearing and electronic controls are not described, since these are well known in the state of the art.

Figure 1:
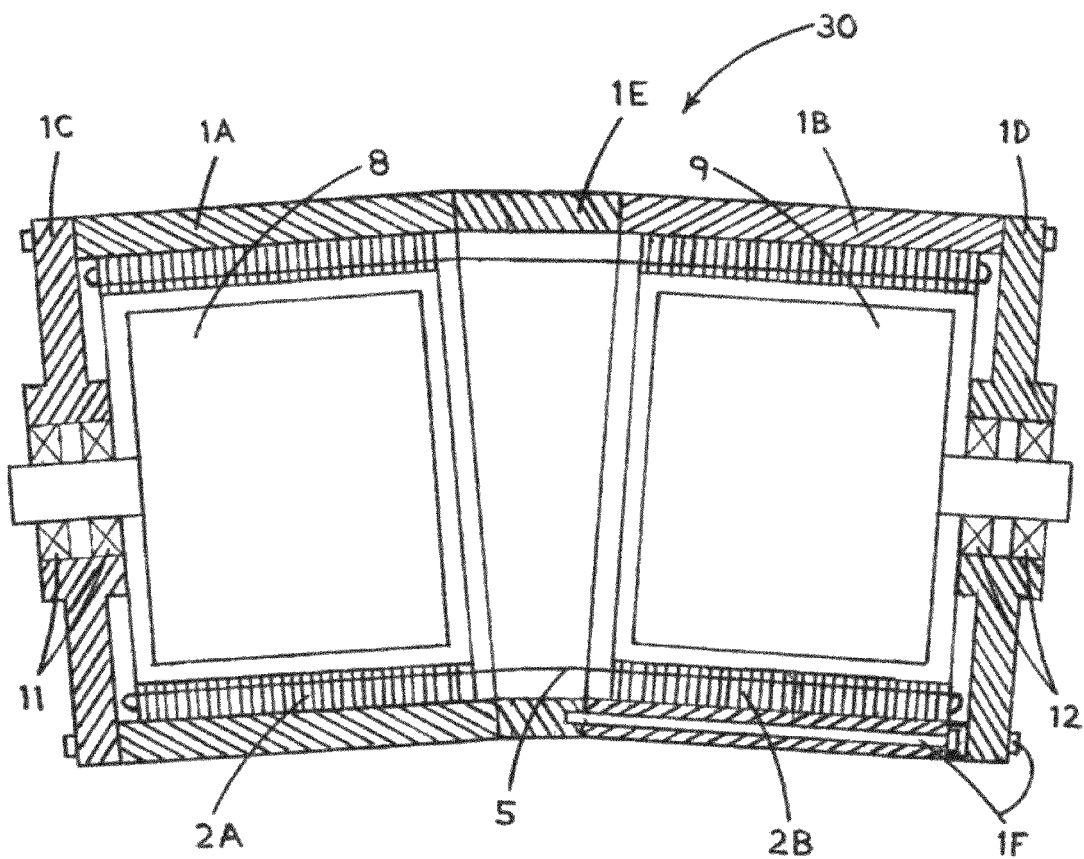
FIG. 1 shows a radial flux machine with non-coaxial rotors that interact mutually with a shared set of stator windings according to an embodiment of the invention.

Referring now to FIG. 1, an electric machine configured as a radial flux machine 30 is shown having non-coaxial rotors which interact mutually with a shared set of stator windings according to an embodiment of the invention. The radial flux machine 30 includes a housing assembly 1 having two hollow body parts 1A and 1B, two end covers 1C and 1D, a wedge ring 1E and screws 1F. The outer surface of wedge ring 1E is preferably an elliptic cylinder cut by two non-parallel planes which generate circular cross sections. As shown, some of screws or studs 1F may fasten body parts 1A and 1B to wedge ring 1E, and others of screws 1F may secure end covers 1C and 1D. Radial flux machine 30 also includes a stator frame 2 comprised of two laminated structures 2A and 2B, as are typical for motors having slot windings. The laminations of structures 2A and 2B may be held together by any of various means, including welding, bonding, bolting, retaining rings or shrinking the housing body. Alternatively, structures 2A and 2B may be configured to form cores as are typical for motors having salient pole windings.

As shown in FIG. 1, each conductor of a stator winding 5 runs continuously from stator frame structure 2A through wedge ring 1E onto stator frame structure 2B. Rotors 8 and 9 are also included in radial flux machine 30 and may be configured as any of a number of conventional types, including: induction, permanent magnet, reluctance, or wound coil with current supplied through brushes and slip rings. The rotors 8 and 9 may also be of two different types, such as one induction type and one permanent magnet type, for example. A single rotor may also include elements of more than one type. For example, a rotor may include permanent magnet type elements and also wound coil type elements. In FIG. 1, each of rotors 8 and 9 is held by bearings 11 and 12 which are mounted in the housing end covers 1C and 1D.

Figure 2:
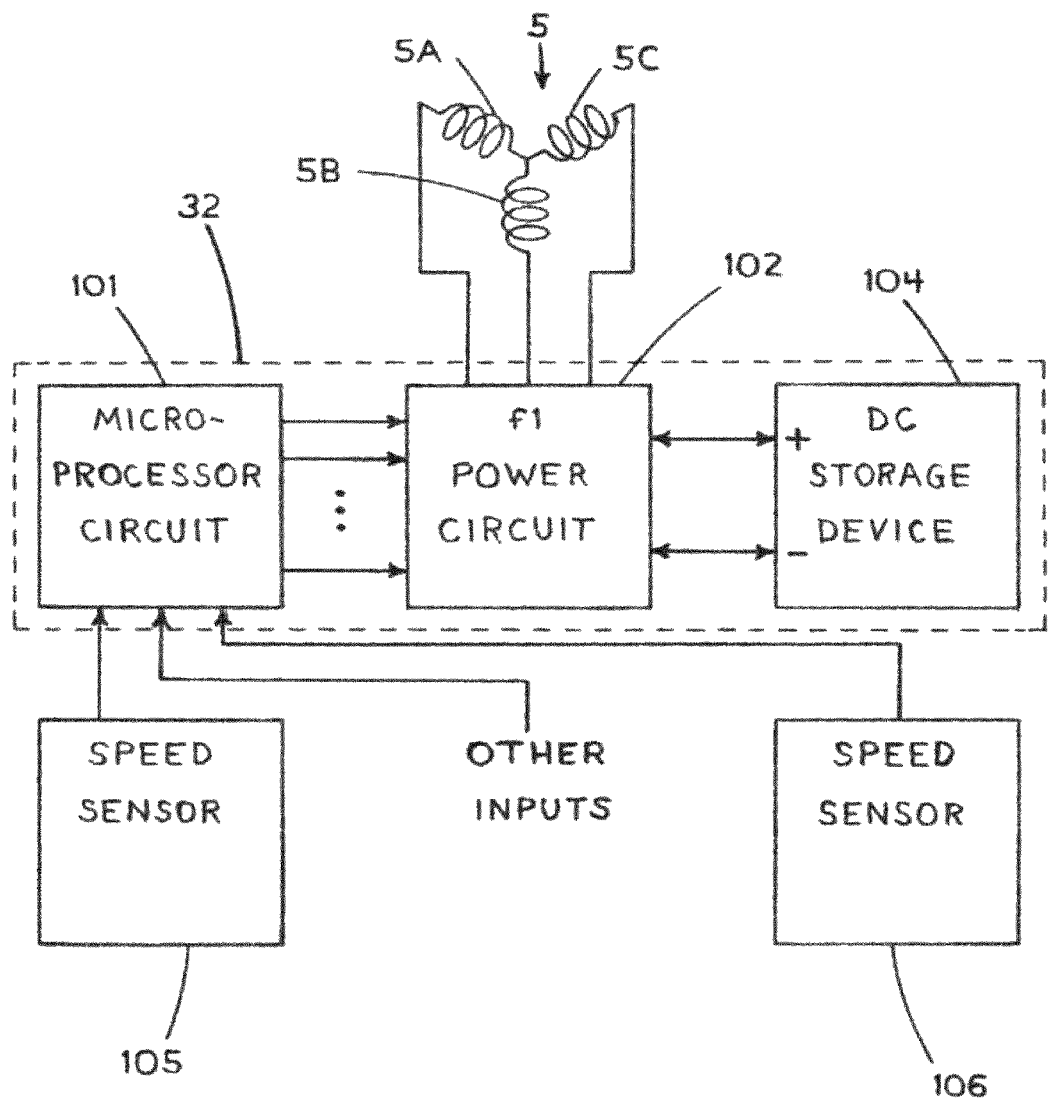
FIG. 2 shows a control scheme for a shared stator machine, such as shown in FIG. 1, having two asynchronous type rotors.

FIG. 2 shows a control scheme for a shared stator machine, such as electric machine 30 shown in FIG. 1, when both rotors 8 and 9 are of the asynchronous type (e.g., two squirrel cage induction rotors). A control unit 32 implements the control scheme and includes a microprocessor circuit 101, a power circuit 102 and a DC storage device 104. The microprocessor circuit 101 receives feedback signals from separate speed sensors 105 and 106 for the two rotors 8 and 9 (FIG. 1), and uses these signals along with at least one other input signal in an algorithm to determine control of the power circuit 102. The power circuit 102 may draw power from or return power to the DC storage device 104, which typically is comprised of capacitors and/or batteries. In this embodiment, the power circuit 102 is a typical three-phase inverter which is connected to the three phases 5A, 5B, 5C of the shared stator windings. The stator phases 5A, 5B, 5C may be connected in either a star/"Y"-configuration (shown) or a delta configuration. The microprocessor circuit 101 switches the inverter 102 to supply three-phase stator current that consists of a single fundamental adjustable frequency f1. If the synchronous speed of the supply is controlled to be faster than both rotor speeds, then both rotors 8 and 9 (FIG. 1) will be driven as motors. If the synchronous speed of the supply is controlled to be slower than both rotor speeds, then both rotors 8 and 9 will be braked, and the regenerated energy will be returned through the control to the DC storage device 104. If the synchronous speed of the supply is controlled to be between the rotor speeds, then the faster rotor 8/9 functions as a generator and the slower rotor 8/9 functions as a motor. Because both rotors 8 and 9 are electromagnetically coupled by the single frequency through the shared stator 5, energy may be transferred from one rotor to the other directly through the stator. Only the net excess or deficiency of energy is exchanged with the DC storage device 104 through the control.

Figure 3:
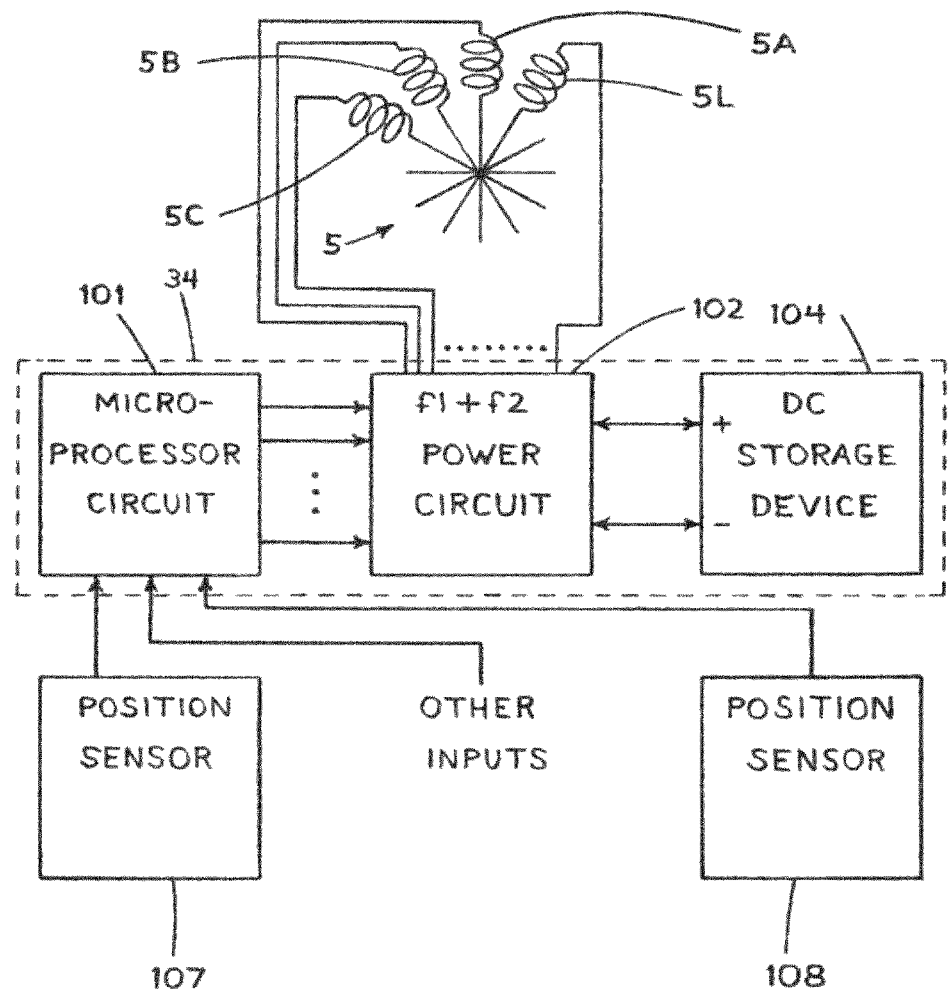
FIG. 3 shows a control scheme for a shared stator machine, such as shown in FIG. 1, having two synchronous type rotors.

FIG. 3 shows a control scheme for a shared stator machine, such as electric machine 30 shown in FIG. 1, when both rotors 8 and 9 are of the synchronous type, for example two permanent magnet rotors, or one permanent magnet rotor and one reluctance rotor. As set forth above, a control unit 34 implements the control scheme and includes a microprocessor circuit 101, a power circuit 102 and a DC storage device 104. In this embodiment, microprocessor circuit 101 receives feedback signals from separate position sensors 107 and 108 for the two rotors 8 and 9 (FIG. 1), and uses these signals along with at least one other input signal in an algorithm to determine control of the power circuit 102. In the case where the two rotors 8 and 9 have different numbers of poles, an algorithm is implemented for supplying stator current that is a composite of two alternating currents with adjustable frequencies f1 and f2. The first alternating current produces a magnetic field rotating in synchronism with the first rotor 8/9, and the second alternating current produces a magnetic field rotating in synchronism with the second rotor 8/9. This allows the rotors 8 and 9 to operate independently at differential speeds. For example, the first rotor 8/9 may have six poles, the second rotor 8/9 may have eight poles, and the stator 5 may have twelve coils 5A, 5B, 5C, . . . 5L connected to a twelve-phase inverter.

Figure 4:
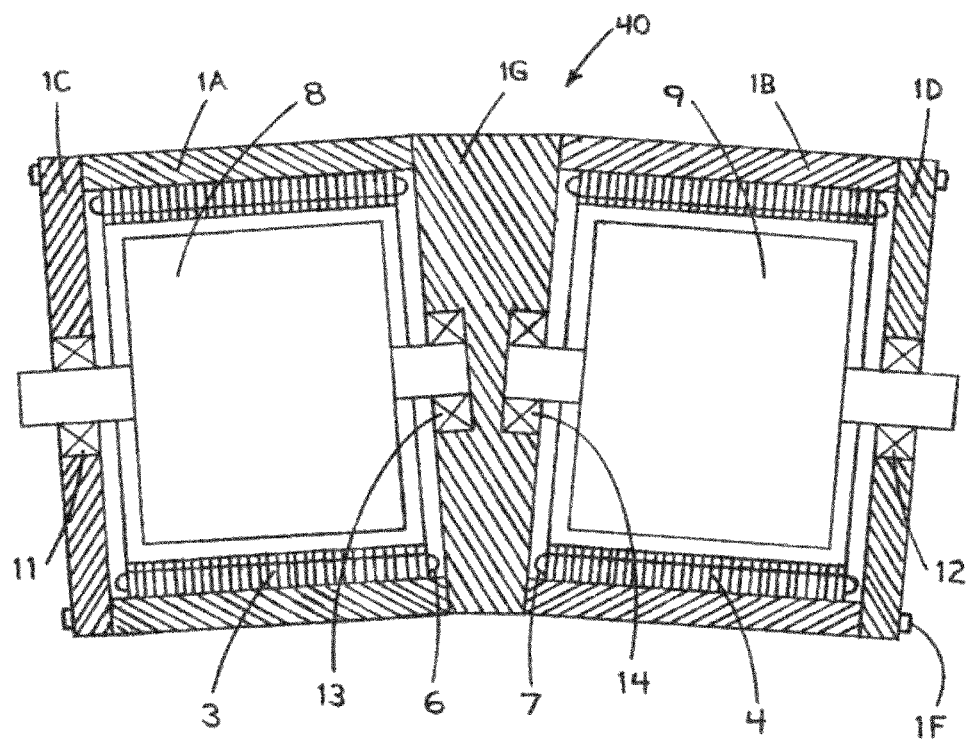
FIG. 4 shows a radial flux machine with a center bearing support and non-coaxial rotors that interact with exclusive sets of stator windings according to an embodiment of the invention.

Referring now to FIG. 4, a radial flux machine 40 is shown having non-coaxial rotors which interact with exclusive sets of stator windings, according to an embodiment of the invention. Radial flux machine 40 includes a housing assembly 1 having two hollow body parts 1A and 1B, two end covers 1C and 1D, and screws 1F. A wedge plate 1G (i.e., center bearing support) is positioned between body parts 1A and 1B and provides the necessary structure for mounting inner bearings 13 and 14. Along with outer bearings 11 and 12, inner bearings 13 and 14 function to provide a more stable arrangement where a rotor 8/9 has bearing support on both sides of its axial center plane. With respect to radial flux machine 30 shown in FIG. 1, it is noted that a wedge plate 1G such as used in radial flux machine 40 could be implemented, provided it includes holes for the continuous stator windings 5 to pass through. Referring again to radial flux machine 40 of FIG. 4, wedge plate 1G may be made from a non-magnetic and/or non-conducting material so as to minimize hysteresis and eddy current losses. Alternatively, the wedge plate 1G may be a laminated structure. In the embodiment of FIG. 4, stator frames 3 and 4 support separate sets of windings 6 and 7. Again, the windings may be of the slot type or may form salient poles. Rotor 8 interacts with winding 6 and rotor 9 interacts with winding 7. The rotors 8 and 9 may be any combination of induction, permanent magnet, reluctance, or wound coil types.

Figure 5:
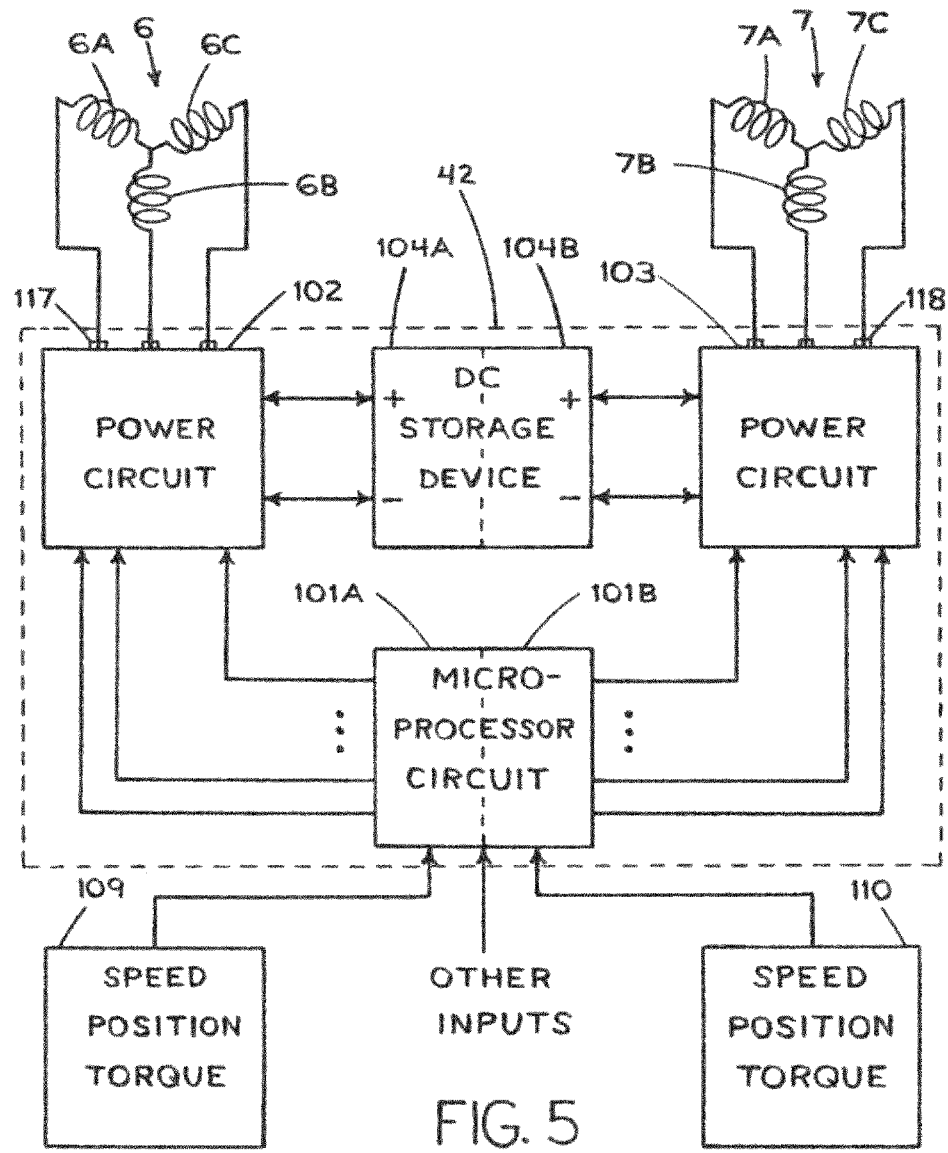
FIG. 5 shows a control scheme for an electric machine, such as shown in FIG. 4, having separate stators connected to separate electronic controls.

FIG. 5 shows a control scheme for an electric machine having separate stators, such as electric machine 40 shown in FIG. 4, in which the separate stators 6 and 7 are connected to terminals 117 and 118 of separate electronic controls. Separate electronic controls is defined here to mean that each stator 6 and 7 exchanges electric power through an exclusive power circuit 102 and 103 included in a control unit 42 configured to implement the control scheme. As shown in FIG. 5, control unit 42 also includes microprocessor circuits 101A and 101B and DC storage devices 104A and 104B that may be separate or combined. The microprocessor circuit(s) 101A and 101B receives feedback signals from separate speed, position and/or torque sensors 109 and 110 for the two rotors 8 and 9 (FIG. 4), and uses these signals along with at least one other input signal in an algorithm to determine control of the power circuits 102 and 103. The power circuits 102 and 103 exchange power with separate sets of stator windings 6A, 6B, 6C and 7A, 7B, 7C. It is recognized that, in this and the following embodiments, the stator phases may be connected in either a star configuration (shown) or a delta configuration.

Figure 6:
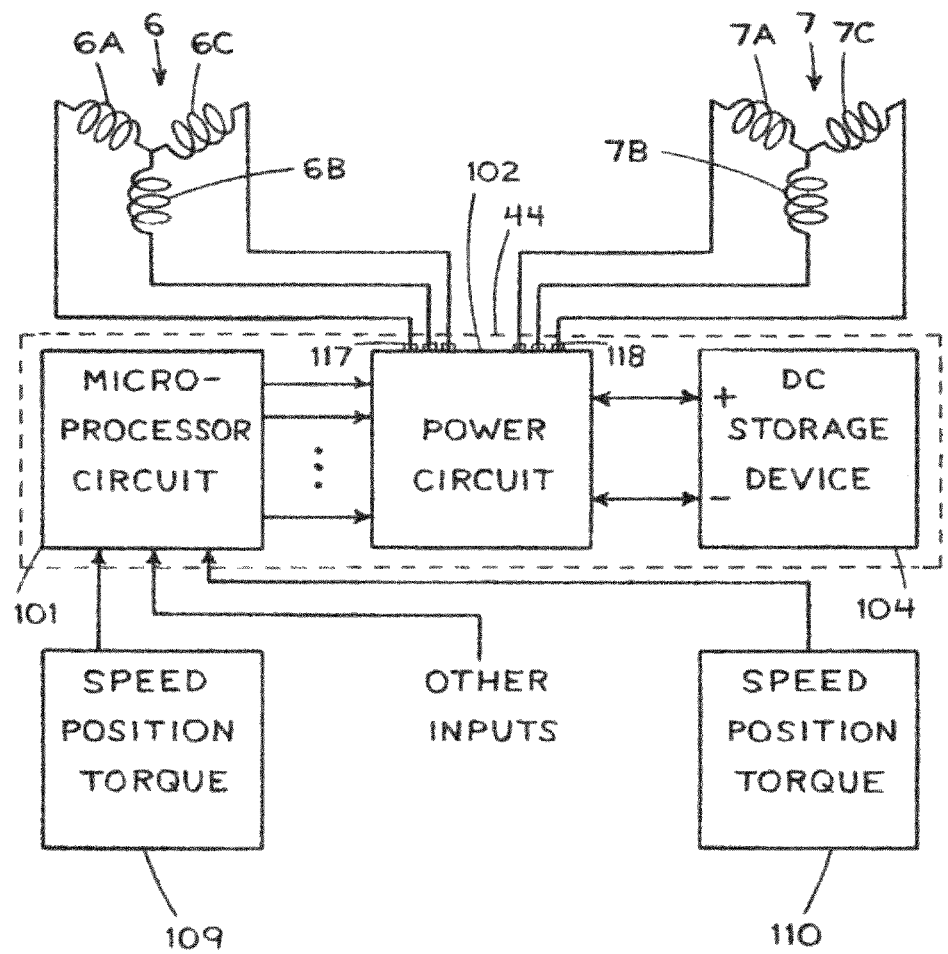
FIG. 6 shows a control scheme for an electric machine, such as shown in FIG. 4, having separate stators connected to separate terminals of a shared electronic control.

FIG. 6 shows a control scheme for an electric machine having separate stators, such as electric machine 40 shown in FIG. 4, in which the separate stators 6 and 7 are connected to separate terminals 117 and 118 of a shared electronic control (i.e., shared power circuit 102). A control unit 44 configured to implement the control scheme includes a microprocessor circuit 101, a power circuit 102 and a DC storage device 104. The microprocessor circuit 101 receives feedback signals from separate speed, position and/or torque sensors 109 and 110 for the two rotors 8 and 9 (FIG. 4), and uses these signals along with at least one other input signal in an algorithm to determine control of the power circuit 102. The power circuit 102 may supply stator current that consists of a single fundamental adjustable frequency, or may supply stator current that is a composite of alternating currents with adjustable frequencies. The separate terminals 117 and 118 on the shared control (i.e., power circuit 102) may provide parallel wiring terminations, or the power outputs to the separate sets of terminals 117 and 118 may be switched differently. FIG. 6 shows three-phase output connected to the separate sets of stator windings 6A, 6B, 6C and 7A, 7B, 7C, but it is to be understood that similar connections could be made for any number of phases, for example twelve-phase output.

Figure 7:
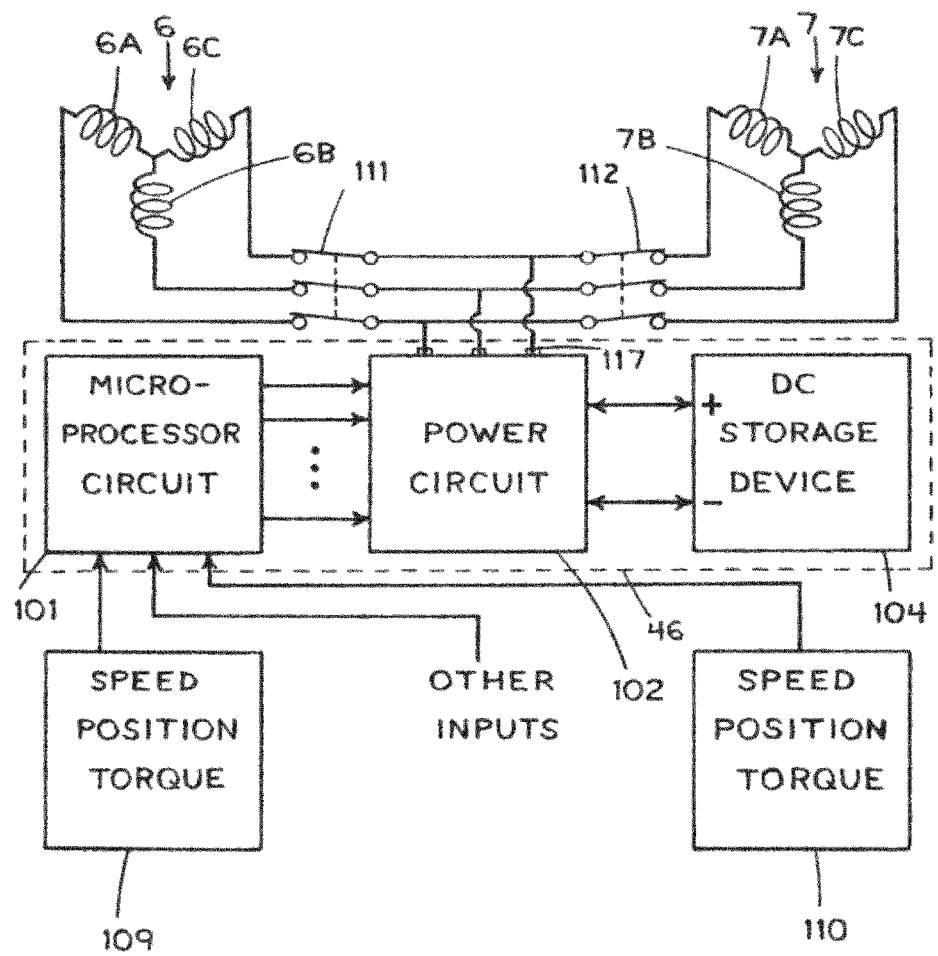
FIG. 7 shows a control scheme for an electric machine, such as shown in FIG. 4, having separate stators connected in parallel to shared terminals.

FIG. 7 shows a control scheme for an electric machine having separate stators, such as electric machine 40 shown in FIG. 4, in which the separate stators 6 and 7 are connected through parallel connections and optional switching devices to shared terminals 117 of a shared electronic control. A control unit 46 configured to implement the control scheme includes a microprocessor circuit 101, a power circuit 102 and a DC storage device 104, and the microprocessor circuit 101 receives feedback signals from separate speed, position and/or torque sensors 109 and 110 for the two rotors 8 and 9 (FIG. 4), and uses these signals along with at least one other input signal in an algorithm to determine control of the power circuit 102. The power circuit 102 may supply stator current that consists of a single fundamental adjustable frequency, or may supply stator current that is a composite of alternating currents with adjustable frequencies. The parallel connections are formed by connecting phases 6A, 6B, 6C of the first stator windings 6 and corresponding phases 7A, 7B, 7C of the second stator windings 7 together to the terminals 117 of the control (i.e., power circuit 102). It is to be understood that similar connections could be made for any number of phases, for example twelve-phase output. For illustrative purposes, FIG. 7 shows optional triple-pole single-throw switches 111 and 112, which may also represent electronic switching devices. The switches 111 and 112 allow either stator 6/7 to be energized separately or both in parallel.

Figure 8:
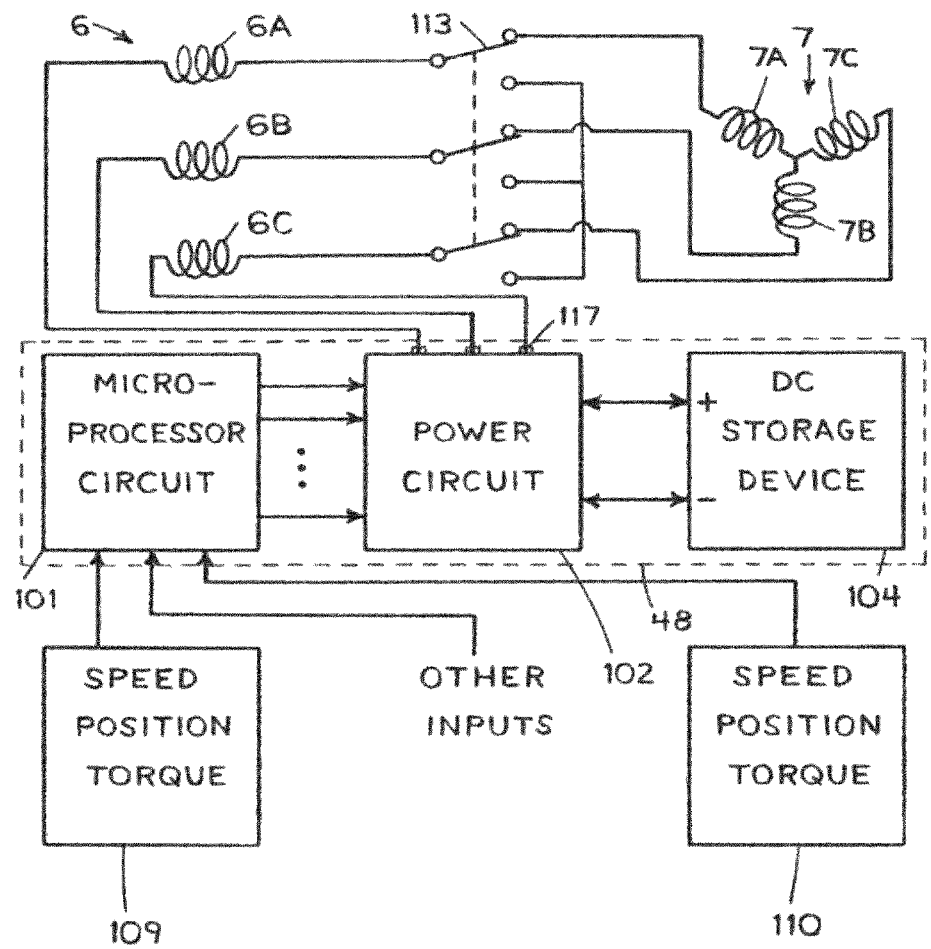
FIG. 8 shows a control scheme for an electric machine, such as shown in FIG. 4, having separate stators connected in series to shared terminals.

FIG. 8 shows a control scheme for an electric machine having separate stators, such as electric machine 40 shown in FIG. 4, in which separate stators 6 and 7 are connected through series connections and optional switching devices to shared terminals 117 of a shared electronic control. A control unit 48 configured to implement the control scheme includes a microprocessor circuit 101, a power circuit 102 and a DC storage device 104. The microprocessor circuit 101 receives feedback signals from separate speed, position and/or torque sensors 109 and 110 for the two rotors 8 and 9 (FIG. 4), and uses these signals along with at least one other input signal in an algorithm to determine control of the power circuit 102. The power circuit 102 may supply stator current that consists of a single fundamental adjustable frequency, or may supply stator current that is a composite of alternating currents with adjustable frequencies. The series connections are formed by connecting one end of each of phase windings 6A, 6B, 6C of the first stator 6 to the terminals 117 of the control (i.e., power circuit 102). The opposite ends of windings 6A, 6B, 6C are connected to one end of each of phase windings 7A, 7B, 7C of the second stator 7. The opposite ends of windings 7A, 7B, 7C are connected together at a common point. It is to be understood that similar connections could be made for any number of phases, for example twelve-phase output. For illustrative purposes, FIG. 8 shows optional triple-pole double-throw switch 113, which may also represent an electronic switching device. When switched opposite to the state that is shown, the second stator 7 will be disconnected, and the first stator 6 will remain energized. In such a scenario, it is likely that the output voltage of the power circuit 102 would need to be reduced. According to additional embodiments of the invention, a switching scheme can be implemented that would allow either stator 6/7 to be energized separately or both in series.

Figure 9:
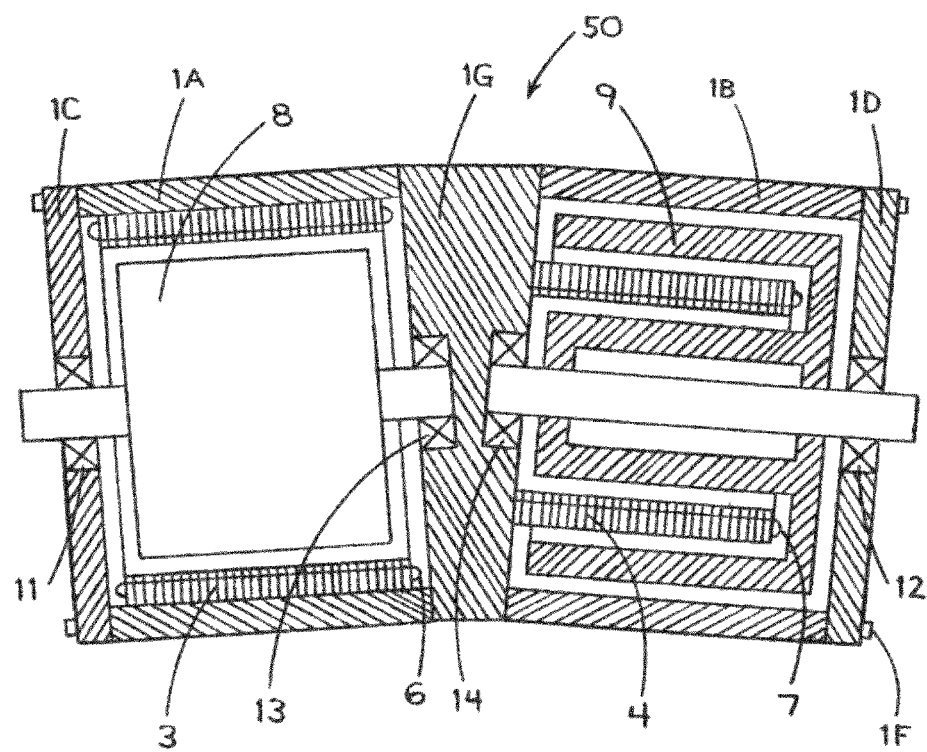
FIG. 9 shows a radial flux machine with one induction rotor and one permanent magnet rotor having double-shell type construction according to an embodiment of the invention.

Referring now to FIG. 9, a radial flux machine 50 is shown having non-coaxial rotors in which one rotor is an induction type and the other rotor is a permanent magnet type having double-shell construction. Radial flux machine 50 includes a housing assembly having two hollow body parts 1A and 1B, two end covers 1C and 1D, a wedge plate 1G and screws 1F. A stator frame 3, stator winding 6, and rotor 8 in radial flux machine 50 are configured as a typical squirrel cage induction motor, with the rotor 8 held by bearings 11 and 13. Also included in radial flux machine 50 is a hollow cylindrical stator frame 4 fastened to wedge plate 1G in a cantilever fashion, so as to leave a gap between the outside of stator frame 4 and the inside of body part 1B. Rotor 9 has a double-shell type construction such that permanent magnets (not shown) on the inner surface of the outer shell surround a stator winding 7, and permanent magnets on the outer surface of the inner shell are inside of the stator winding 7. Poles of the inner and outer magnets are aligned so as to concentrate radial flux lines of the rotor 9 to interact with the stator winding 7. As shown in FIG. 9, rotor 9 is held by bearings 12 and 14.

In general, an induction motor may be operated more efficiently under high-speed low-torque conditions, and a permanent magnet motor may be operated more efficiently under low-speed high-torque conditions. The radial flux machine 50 of FIG. 9 allows the particular characteristics of each type of rotor to be used to advantage, such as when radial flux machine 50 is implemented in a vehicle to provide tractive power to wheels thereof. For example, the induction rotor 8 may drive the rear wheels of a four-wheel drive vehicle through a drive shaft and mechanical differential, and the permanent magnet rotor 9 may drive the front wheels in a similar manner (could also be the other way around). When the vehicle is operating under high-speed low-torque cruising conditions, only the stator 6 for the induction rotor is energized. When torque demand exceeds a set level due to starting or heavy load conditions, an electronic control synchronizes its output frequency with the permanent magnet rotor 9, and energizes the stator 7 for the permanent magnet rotor. When torque demand drops below another set level, the stator 7 for the permanent magnet rotor 9 is de-energized.

Figure 10:
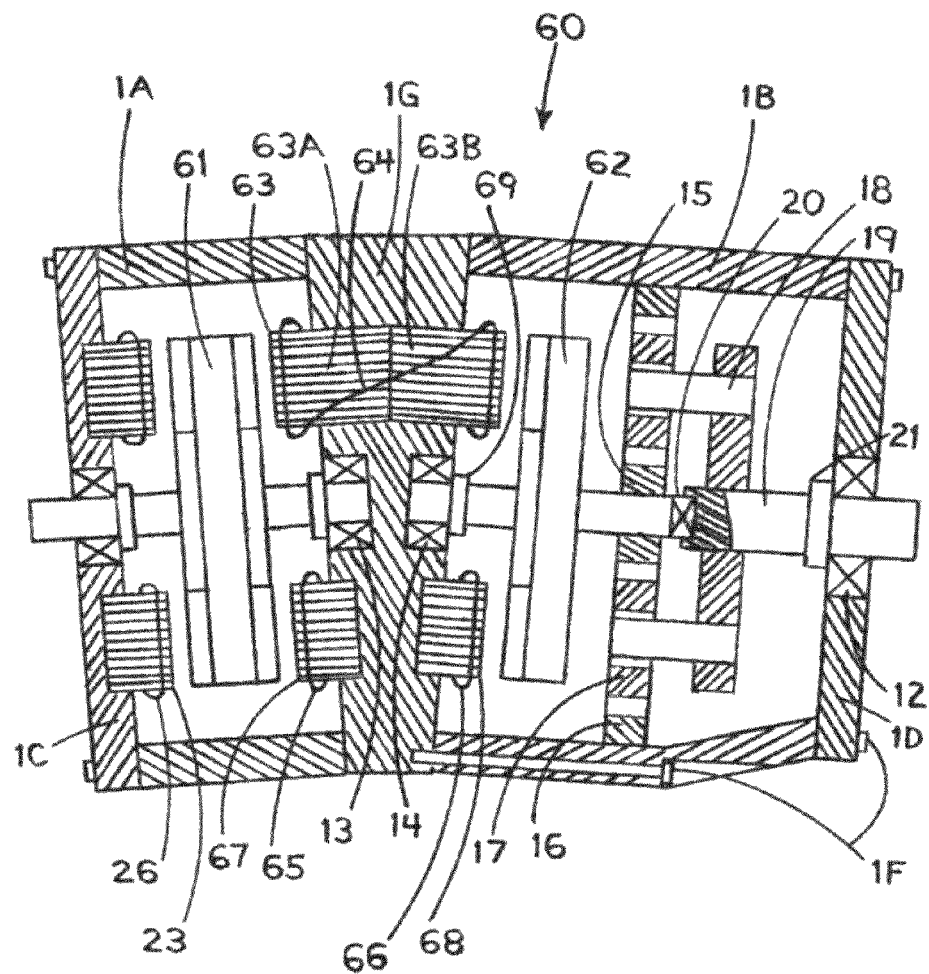
FIG. 10 shows an axial flux machine with non-coaxial rotors and having mechanical gearing according to an embodiment of the invention.

According to another embodiment of the invention, FIG. 10 shows an axial flux machine 60 with non-coaxial rotors 61 and 62. Rotors 61 and 62 are designed for interaction with axial flux, and are also known as disk rotors. Disk rotors 61 and 62 may be constructed as any of the interactive element types: induction, permanent magnet, reluctance, or wound coil rotors. As shown in FIG. 10, axial flux machine 60 includes a housing assembly having two hollow body parts 1A and 1B, two end covers 1C and 1D, a wedge plate 1G and screws 1F. In one embodiment, axial flux machine 60 includes a stator frame 63 having multiple laminated core pieces 63A and 63B, with each core piece having the general shape of a wedge of cake, as is typical for stator cores of axial flux machines. Wedge plate 1G has openings which allow stator core pieces 63A and 63B to penetrate and meet at the axial center plane of the wedge plate. This forms a continuous low reluctance flux path so that both rotors 61 and 62 can interact mutually with a shared set of stator windings 64. In an alternative embodiment, the rotors interact with exclusive sets of stator windings 65 and 66 wound on separate stator frames 67 and 68, in which case it may be desirable to have a non-magnetic isolator between stator frames 67 and 68.

The shafts of disk rotors 61 and 62 include shoulders 69 that butt against bearings 13 and 14 to establish the desired air gaps for the axial flux machine 60. A stator frame 23 with windings 26 can also be located on the opposite side of rotor 61, as shown in the left half of FIG. 10. The right half of FIG. 10 shows the additional feature of mechanical gearing. In this case, planetary gearing is shown, with sun gear 15 mounted on the shaft of rotor 62, ring gear 16 mounted to the housing body 1B, and planetary gears 17 mounted on carrier 18, which has a shaft 19 exiting the housing. Shaft 19 includes a shoulder 21 that butts against bearing 12, and a thrust bearing 20 is mounted between shaft 19 and the shaft of rotor 62. Mechanical gearing could also be used optionally with any of the embodiments previously described. It is also envisioned that a flux machine could be constructed that includes both axial flux type and radial flux type rotors in the same housing.

Figure 11:
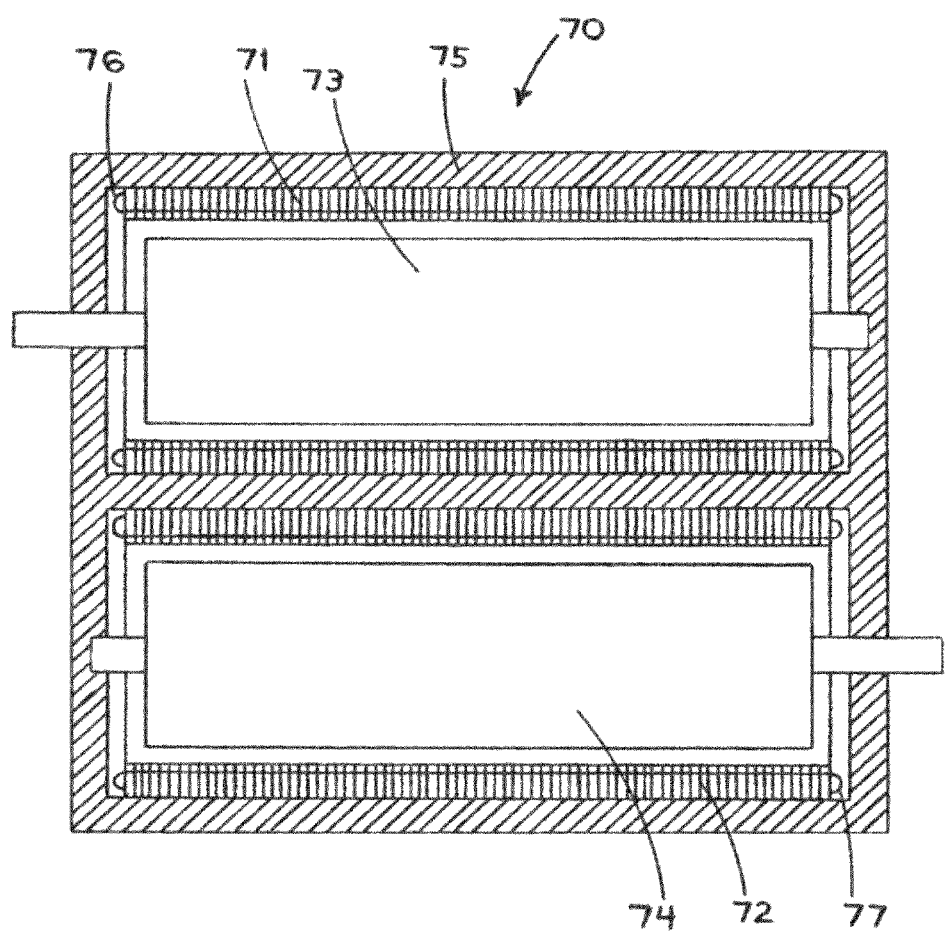
FIG. 11 shows a diagram of a machine having parallel rotors according to an embodiment of the invention.
Figure 12:
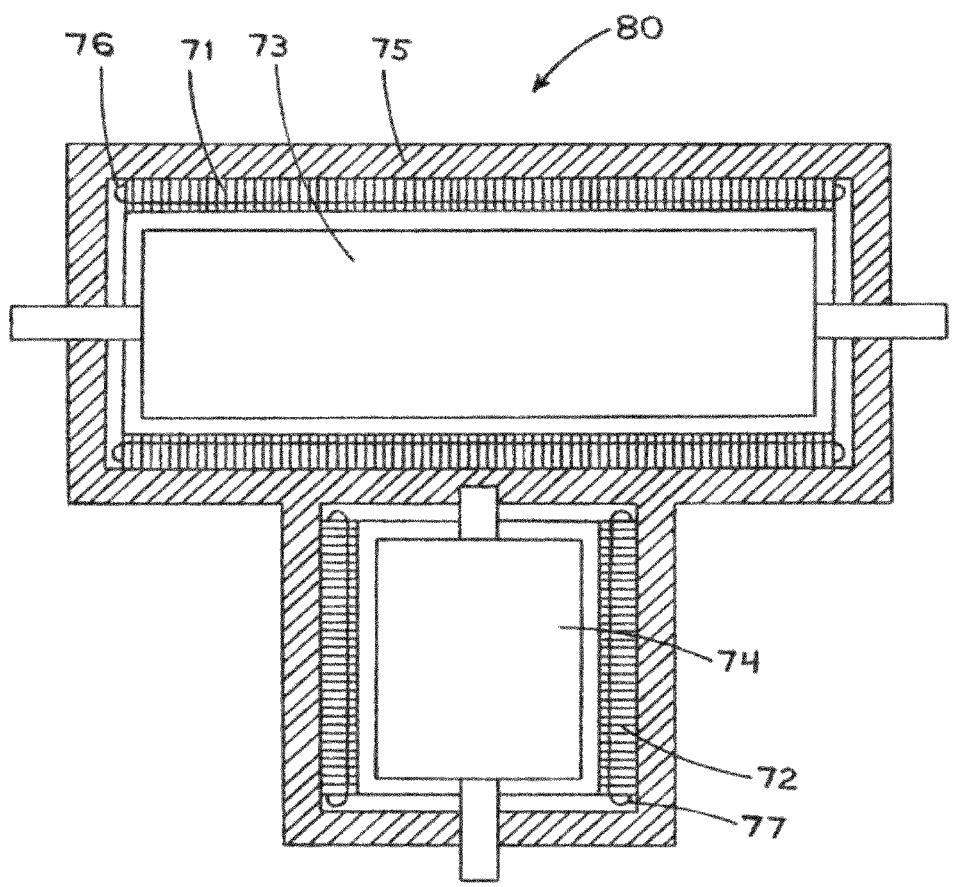
FIG. 12 shows a diagram of a T-shaped two rotor machine according to an embodiment of the invention.

Referring to FIG. 11, a diagram of a machine 70 having parallel rotors is shown. In FIG. 12, a diagram of a T-shaped two rotor machine 80 is shown. In each of the embodiments of machines 70/80 of FIGS. 11 and 12, the machine includes stator frames 71 and 72 and rotors 73 and 74 that are held by a common or unitary housing assembly 75. As shown in FIGS. 11 and 12, the rotors 73 and 74 interact with stator windings 76 and 77. The machines 70 and 80 may combine any of a plurality of rotor types, control methods or other features previously described (i.e., induction, permanent magnet, reluctance, or wound coil). Both rotors 73 and 74 may operate as driving motors with regeneration capability, or one of the rotors may be driven as a generator.

Figure 13:
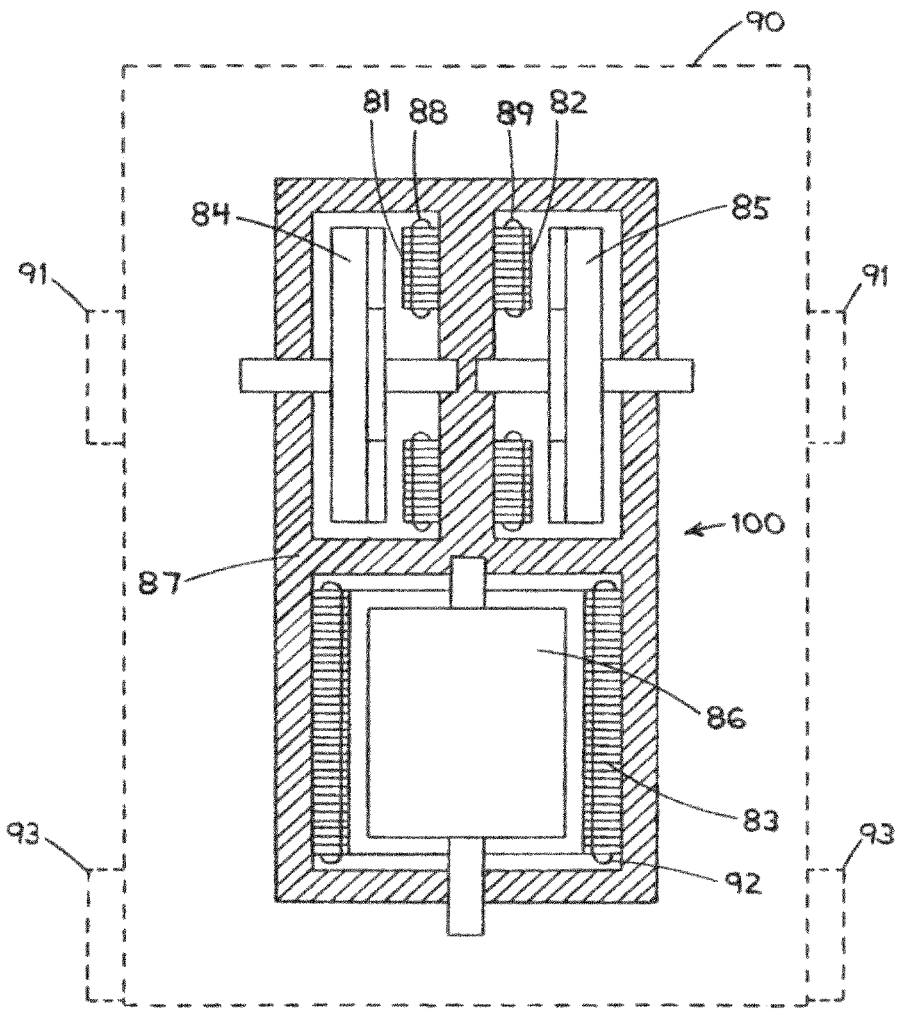
FIG. 13 shows a diagram of a T-shaped three rotor machine according to an embodiment of the invention.

According to another embodiment of the invention, FIG. 13 shows a diagram of a T-shaped three rotor machine 100, such as for use in providing power in a vehicle 90 to wheels 91, 93. Included in machine 100 are stator frames 81, 82, 83 and rotors 84, 85, 86 that are held by housing assembly 87, and the rotors 84, 85, 86 interact with stator windings 88, 89, 92. While rotors 84 and 85 are co-axial with respect to one another in machine 100, each of rotors 84 and 85 is non-coaxial with rotor 86, thus forming a machine with multiple rotors in a non-coaxial arrangement. In one embodiment, rotor 86 is driven by a rotary input, such as an internal combustion engine. According to this embodiment, rotors 84 and 85 differentially drive left and right wheels 91 of vehicle 90, and power from stator winding 92 is converted to be delivered to stator windings 88 and 89 or stored in a DC storage device (not shown). According to another embodiment, rotors 84 and 85 are induction type rotors that differentially drive the wheels 91 of one vehicle axle, and permanent magnet rotor 86 drives the wheels 93 of another axle through a drive shaft and mechanical differential (not shown). When the vehicle 90 is operating under high-speed low-torque cruising conditions, only the stator windings 88 and 89 for the induction rotors 84 and 85 are energized. When torque demand exceeds a set level due to starting or heavy load conditions, a control unit (not shown) such as those described in FIGS. 2-3 and 5-8 synchronizes its output frequency with the permanent magnet rotor 86, and energizes the stator winding 92 for the permanent magnet rotor. When torque demand drops below another set level, the stator winding 92 for the permanent magnet rotor 86 is de-energized.

Therefore, according to one embodiment of the invention, a rotary electric machine includes a housing assembly, at least one stator frame mounted in the housing assembly, at least one stator winding wound on the at least one stator frame, and at least two rotors mounted in the housing assembly and having axes of rotation that are non-coaxial, wherein each of the at least two rotors is mechanically decoupled from the other rotors such that each of the at least two rotors rotates independent from one another. The rotary electric machine also includes a control unit, with the control unit including at least one electronic control electrically connected to the at least one stator winding. The control unit is configured to control an exchange of power to and/or from each of the at least one stator windings.

According to another embodiment of the invention, a rotary electric machine includes a housing assembly, at least one stator frame mounted in the housing assembly, and at least one stator winding wound on the at least one stator frame. The rotary electric machine also includes a plurality of rotors mounted in the housing assembly, with the plurality of rotors including a rotor whose axis of rotation is non-coaxial from an axis of rotation of at least one other rotor in the plurality of rotors. The plurality of rotors includes at least a first rotor and a second rotor mechanically decoupled from the first rotor, wherein each of the first rotor and the second rotor has electromagnetic interaction with the at least one stator winding when the at least one stator winding is supplied with power. The rotary electric machine further includes a control unit comprising at least one power circuit to control an exchange of power to and/or from each of the at least one stator windings to cause rotation of at least one of the first rotor and the second rotor, with the control unit configured to receive an input signal for each of the first and second rotors, the input signal including data on at least one of rotor speed, rotor position, or rotor torque for each of the first and second rotors and determine a stator current to transmit to each of the at least one stator windings, such that a speed and a direction of rotation of each of the first rotor and the second rotor is independently controllable.

According to yet another embodiment of the invention, a rotary electric machine configured to supply tractive power in a vehicle includes a unitary housing assembly, at least one stator frame mounted in the unitary housing assembly, at least one stator winding wound on the at least one stator frame and a control unit configured to control an exchange of power to and/or from each of the at least one stator windings. The rotary electric machine also includes a plurality of rotors housed in the unitary housing assembly, with the plurality of rotors including a rotor whose axis of rotation is non-coaxial from an axis of rotation of at least one other rotor in the plurality of rotors, and wherein the plurality of rotors includes a first rotor mechanically coupled to supply tractive power to a first wheel or set of wheels on the vehicle and a second rotor mechanically decoupled from the first rotor. The second rotor is either mechanically coupled to supply tractive power to a second wheel or set of wheels on the vehicle or is mechanically coupled to receive a rotary input that drives the second rotor as a generator. The control unit included in the rotary electric machine is configured to selectively control power exchanged to and/or from the plurality of rotors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotary electric machine comprising:
   a housing assembly;
   at least one stator frame mounted in the housing assembly;
   at least one stator winding wound on the at least one stator frame;
   at least two rotors mounted in the housing assembly and having axes of rotation that are non-coaxial, wherein each of the at least two rotors is mechanically decoupled from the other rotors such that each of the at least two rotors rotates independent from one another; and
   a control unit including at least one electronic control electrically connected to the at least one stator winding, the control unit configured to control an exchange of power to or from each of the at least one stator windings;
   wherein at least one rotor comprises a rotor configured to interact with radial flux.

2. The rotary electric machine according to claim 1, wherein the housing assembly further comprises a wedge ring or wedge plate configured to angularly offset a first rotor from a second rotor such that the axis of rotation of the first rotor is non-coaxial with respect to the axis of rotation of the second rotor.

3. The rotary electric machine according to claim 1, further comprising bearings mounted in the housing assembly to provide at least one of radial and axial bearing support on one side of an axial center plane of the rotor or on both sides of the axial center plane of the rotor.

4. The rotary electric machine according to claim 1, wherein each of the at least two rotors includes a rotor shaft, and wherein the housing assembly includes mechanical gears to couple at least one rotor or its rotor shaft to a separate output shaft that exits the housing assembly.

5. The rotary electric machine according to claim 1, wherein the at least two rotors comprise at least one of an induction type rotor, a permanent magnet type rotor, a reluctance type rotor, a wound coil type rotor, or a rotor combining elements thereof.

6. The electric machine according to claim 1, wherein at least one rotor comprises a double-shell rotor having an inner shell and an outer shell for interaction with radial flux.

7. The electric machine according to claim 1, wherein at least one rotor comprises a disk rotor configured to interact with axial flux.

8. The electric machine according to claim 1, wherein the at least one stator winding comprises a shared stator winding wound about the at least one stator frame; and
wherein a pair of the rotors interact mutually with the shared stator winding.

9. The electric machine according to claim 1, wherein the at least one stator winding comprises a first stator winding wound about a first stator frame and a second stator winding wound about a second stator frame; and
wherein each of a pair of rotors interact exclusively with the first stator winding and the second stator winding.

10. The electric machine according to claim 9, wherein the control unit comprises a first electronic control and a second electronic control, and wherein the first stator winding is connected to the connection terminals of the first electronic control and the second stator winding is connected to the connection terminals of the second electronic control.

11. The electric machine according to claim 9, wherein the control unit comprises a shared electronic control having a first set of connection terminals and a second set of connection terminals, and wherein the first stator winding is connected to the first set of connection terminals and the second stator winding is connected to the second set of connection terminals.

12. The electric machine according to claim 9, wherein the control unit comprises a shared electronic control, and wherein the first stator winding and the second stator winding are connected to the connection terminals of the electronic control in one of a parallel arrangement or a series arrangement.

13. The electric machine according to claim 9, wherein the control unit comprises a shared electronic control, and wherein the electric machine further comprises a switching device configured to selectively electrically connect each of the first stator winding and the second stator winding to the electronic control.

14. The electric machine according to claim 1, wherein the at least one electronic control is configured to supply the at least one stator winding with stator current having a single fundamental adjustable frequency.

15. The electric machine according to claim 1, wherein the at least one electronic control is configured to supply the at least one stator winding with stator current having a composite of two or more alternating currents with adjustable frequencies.

16. The electric machine according to claim 1, wherein the control unit is configured to receive feedback from at least one of rotor speed sensors, rotor position sensors, or rotor torque sensors.

17. The electric machine according to claim 1, wherein the at least two rotors comprises a first rotor, a second rotor, and a third rotor, and
wherein the first, second, and third rotors are incorporated into a vehicle, and wherein the first and second rotors drive first and second wheels or sets of wheels on the vehicle, and the third rotor either drives a third set of wheels on the vehicle or receives a rotary input that drives the third rotor as a generator.

18. A rotary electric machine comprising:
a housing assembly;
at least one stator frame mounted in the housing assembly;
at least one stator winding wound on the at least one stator frame;
a plurality of rotors mounted in the housing assembly, the plurality of rotors including a rotor whose axis of rotation is non-coaxial from an axis of rotation of at least one other rotor in the plurality of rotors, and wherein the plurality of rotors includes at least a first rotor and a second rotor mechanically decoupled from the first rotor, and wherein each of the first rotor and the second rotor has electromagnetic interaction with the at least one stator winding when the at least one stator winding is supplied with power; and
a control unit comprising at least one power circuit to control an exchange of power to or from each of the at least one stator windings to cause rotation of at least one of the first rotor and the second rotor, the control unit configured to:
receive an input signal for each of the first and second rotors, the input signal including data on at least one of rotor speed, rotor position, or rotor torque for each of the first and second rotors; and
determine a stator current to transmit to each of the at least one stator windings, such that a speed and a direction of rotation of each of the first rotor and the second rotor is independently controllable.

19. The electric machine according to claim 18, wherein the control unit is configured to generate a stator current comprising one of a single fundamental adjustable frequency current or a composite current of alternating currents with adjustable frequencies.

20. The electric machine according to claim 18, wherein the first rotor and the second rotor comprise at least one of induction elements, permanent magnet elements, reluctance elements, or wound coil elements.

21. The electric machine according to claim 18, wherein at least one of the plurality of rotors is an induction type rotor and at least another of the plurality of rotors is a permanent magnet type rotor.

22. The electric machine according to claim 18, wherein the plurality of rotors further comprises at least one additional rotor mounted in the housing assembly, the at least one additional rotor having an axis of rotation that is non-coaxial from the axis of rotation of at least one of the first rotor or the second rotor.

23. The electric machine according to claim 18, wherein the first and second rotors are configured to supply tractive power in a vehicle, and wherein the control unit is configured to control power to the first rotor and the second rotor to differentially drive a first wheel or set of wheels and a second wheel or set of wheels with a desired tractive power.

24. A rotary electric machine configured to supply tractive power in a vehicle, the rotary electric machine comprising:
   a unitary housing assembly;
   at least one stator frame mounted in the unitary housing assembly;
   at least one stator winding wound on the at least one stator frame;
   a control unit configured to control an exchange of power to or from each of the at least one stator windings; and
   a plurality of rotors housed in the unitary housing assembly, the plurality of rotors including a rotor whose axis of rotation is non-coaxial from an axis of rotation of at least one other rotor in the plurality of rotors, and wherein the plurality of rotors includes:
      a first rotor mechanically coupled to supply tractive power to a first wheel or set of wheels on the vehicle; and
      a second rotor mechanically decoupled from the first rotor, the second rotor being either mechanically coupled to supply tractive power to a second wheel or set of wheels on the vehicle, or mechanically coupled to receive a rotary input that drives the second rotor as a generator;
   wherein the control unit is configured to selectively control power exchanged to or from the plurality of rotors.

25. The electric machine according to claim 24, wherein an axis of rotation of the first rotor is non-coaxial from an axis of rotation of the second rotor.

26. The electric machine according to claim 24, wherein the plurality of rotors further comprises a third rotor, the third rotor being either mechanically coupled to supply tractive power to a third wheel or set of wheels on the vehicle, or mechanically coupled to receive a rotary input that drives the third rotor as a generator; and
   wherein the first and second rotors have either coaxial or non-coaxial axes of rotation and the third rotor has an axis of rotation non-coaxial from the axis of rotation of at least one of the first rotor or the second rotor.

27. The electric machine according to claim 24, wherein at least one of the plurality of rotors is an induction type rotor and at least another of the plurality of rotors is a permanent magnet type rotor.

28. A rotary electric machine comprising:
   a housing assembly;
   at least one stator frame mounted in the housing assembly;
   at least one stator winding wound on the at least one stator frame;
   at least two rotors mounted in the housing assembly and having axes of rotation that are non-coaxial, wherein each of the at least two rotors is mechanically decoupled from the other rotors such that each of the at least two rotors rotates independent from one another; and
   a control unit including at least one electronic control electrically connected to the at least one stator winding, the control unit configured to control an exchange of power to or from each of the at least one stator windings
   wherein at least one rotor comprises a disk rotor configured to interact with axial flux.

* * * * *